United States Patent Office

2,748,485
Patented June 5, 1956

2,748,485

NAVIGATION COURSE COMPUTER

William H. Newell, Mount Vernon, N. Y., assignor to Sperry Rand Corporation, a corporation of Delaware Application October 12, 1953, Serial No. 385,661

14 Claims. (Cl. 33—1)

This invention relates to a computer for solving spherical geometrical problems encountered in air and sea navigation.

It is a primary object of the present invention to compute the proper heading and distance over a great circle course between present position and a known destination. The desired heading is obtained for the instant at which the inputs are introduced into the computer and can be introduced into follow up devices and servo units for automatic steering control. Some of the inputs are known while others are estimated and preset into the device after being determined by means outside the scope of the present invention. In the former group are the coordinates of the destination and bearings of two preselected known stations or points. In the latter group are the coordinates of the present position of the plane or ship. Predicated upon the known and the previously calculated coordinates a great circle bearing between one of the known points and the present position is represented in one of the computer elements which bearing is compared with the known bearing in degrees between these two points. The resulting error, if any, is introduced into an error reducer where it is converted into errors in the coordinates of present position. When the corrections have been made for these coordinates, any discrepancy between the bearing to one of the known points as indicated by the computer elements and the actual bearing will have been eliminated. It is therefore an object of the present invention to obtain correction factors as increments of latitude and longitude which may be added to assumed values of latitude and longitude to produce correct values for the present position.

The corrected values of latitude and longitude of present position are introduced into another element of the computer into which there has also been preset known values of latitude and longitude for the destination. This computer element including an annular flange the angular position of which represents in accordance with predetermined calculations the great circle route between present position and destination the determination of which is one of the principal objects of the invention. The center of the flange is a reference point which is an assumed present position and is located by the introduction of the corrected value for the latitude of the present position. The positioning of this point is restricted to a plane which includes a fixed reference line symbolically representing the polar axis of the earth. A slotted arm is pivoted on the flange and has a curvature to simulate the curvature of the earth. It is apparent, therefore, that when the arm intersects this reference point the distance on the arm between this reference point, which is taken as the present position, and any other point on the arm is proportional to the great circle path having the same radial angle. The second point on the arm is determined in accordance with the known coordinates of the destination and is representative thereof. A potentiometer mounted on the arm which intersects the defined points representing the destination and present position of the plane may therefore yield a voltage which is proportional in land units of measure to this distance over a great circle course.

Another object of the invention is to provide means for indicating errors in the great circle course and converting such errors into corrections for the course indicator.

Another object of the invention is to provide means for determining the course of the aircraft or ship at the destination.

Another object of the invention is to provide means comprising standard computer elements for converting an error in course angle from a known point to an assumed present position to correction factors for the assumed coordinates of present position.

The foregoing objects are accomplished by the use of instruments familiar in the computer art. These devices principally comprise servo amplifiers and motors for converting electrical impulses into mechanical motion, resolvers, differentials and gimbal assemblies for mechanically defining the various inputs for the coordinates of latitude and longitude of known and assumed positions.

Other objects and advantages will appear from the following description and accompanying drawings, which show by way of example only and not by way of limitation one embodiment of the invention.

Figure 1:
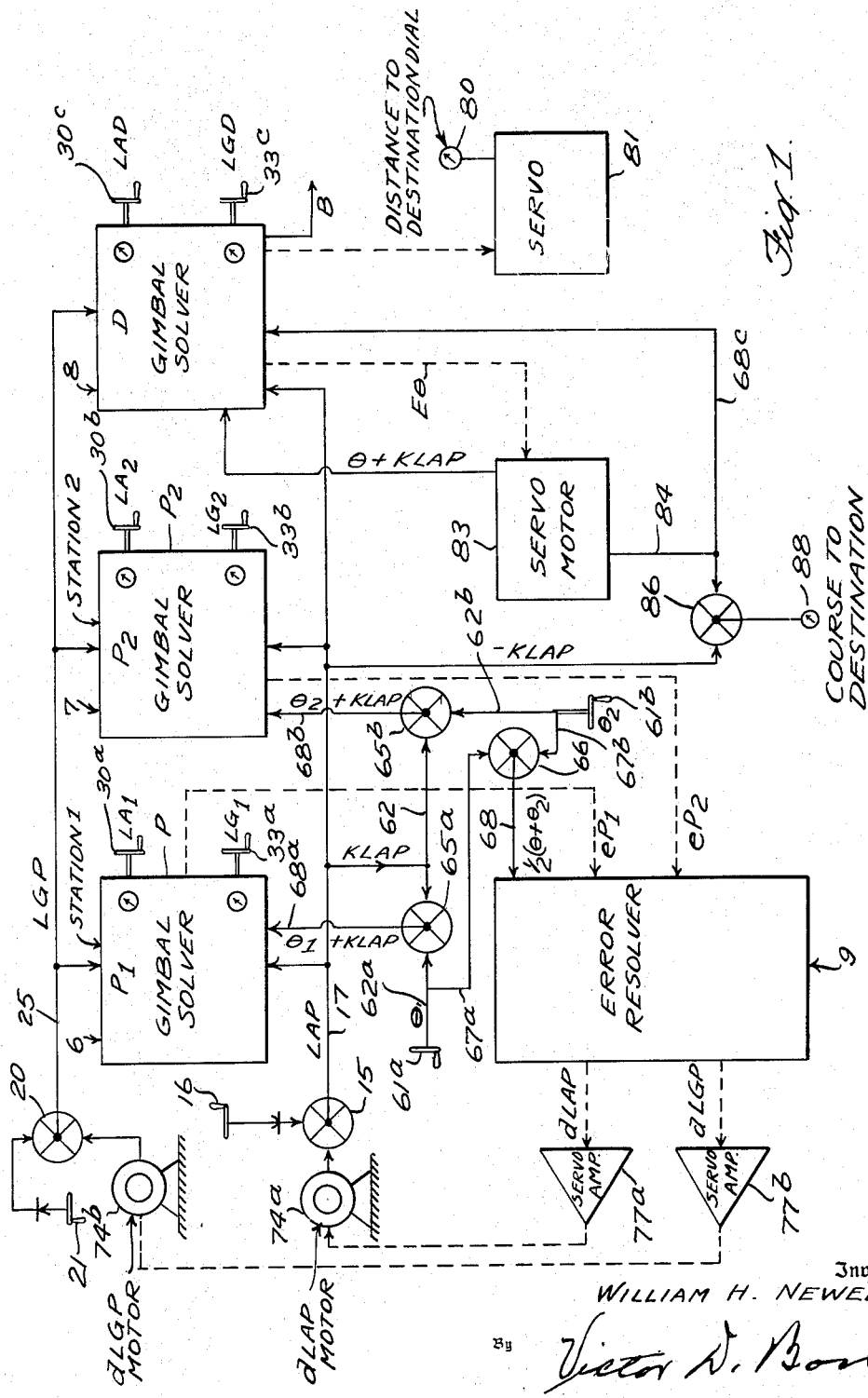
Fig. 1 is a schematic showing of all the units of the computer and their connections.
Figure 2:
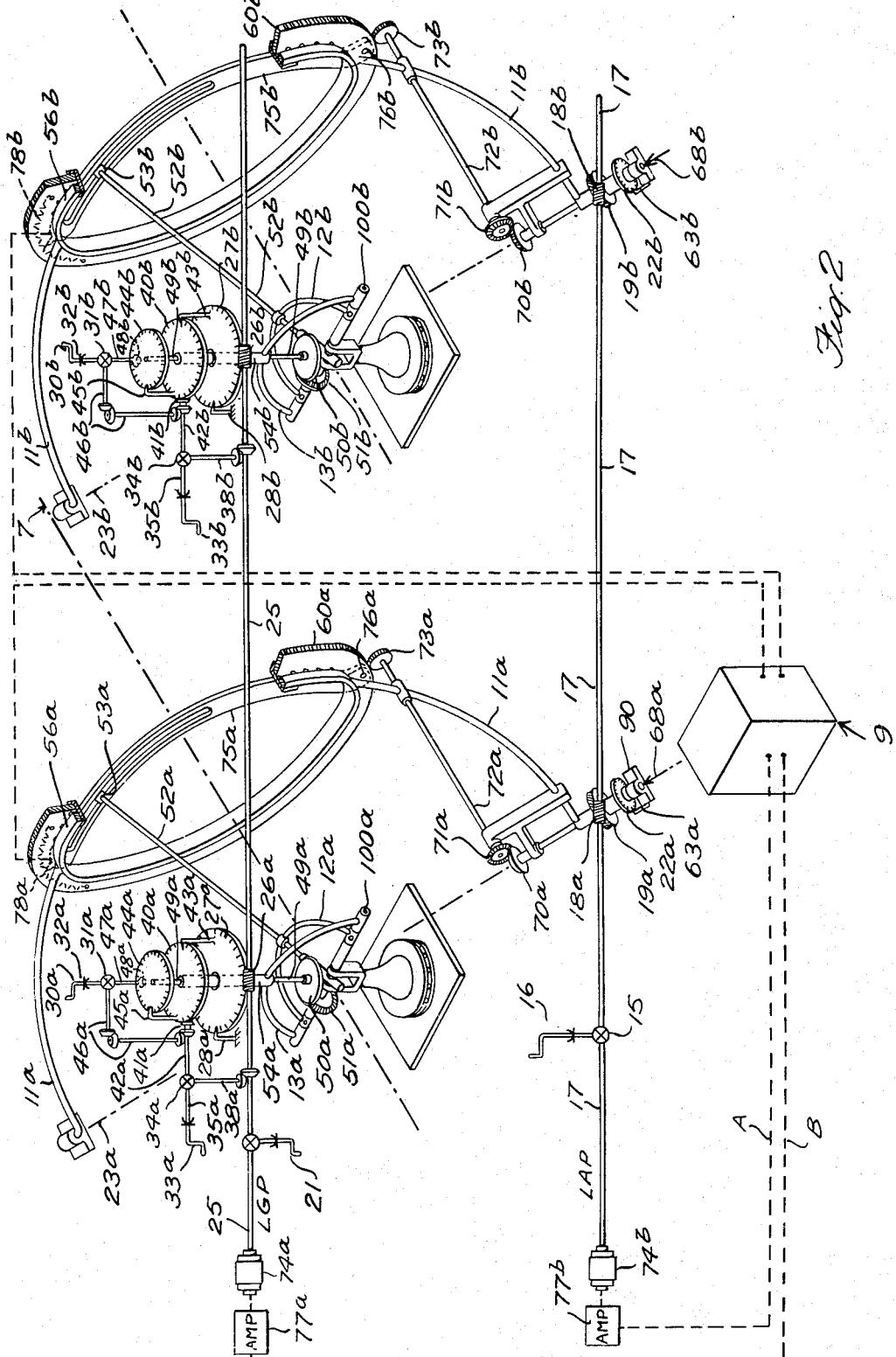
Fig. 2 is a schematic diagram showing two station gimbal computers and the error reducer.

Referring to Figs. 1 and 2 three similar gimbal solvers 6, 7 and 8 one each for data relative to the location of stations 1 and 2 and the destination respectively, known points of location, constitute the principal computing elements. Stations 1 and 2 herein designated as $P_1$ and $P_2$, respectively, are known points on the earth's surface and the spherical angles found by the intersection of the local meridian with the paths from the present position to the stations are determinable, as by radio compass, and are designated $\theta_1$ and $\theta_2$ respectively see Fig. 5. The positions of the stations being known, their coordinates can also be accurately determined. These coordinates are designated $LA_1$ and $LG_1$ which are the latitude and longitude of station 1, respectively, and $LA_2$ and $LG_2$ which are the latitude and longitude respectively, of station 2. The coordinates of the plane's present or transient position are assumed by independent calculation as by celestial observation and conventional navigation procedures. The coordinates are designated $LAP$ and $LGP$ for the plane's latitude and longitude, respectively.

It is the special function of $P_1$ gimbal solver 6 and $P_2$ gimbal solver 7 in combination with error resolver 9 to compute errors or correction increments for the assumed values of the plane's present position. Specifically gimbal solvers 6 and 7 yield errors in $\theta_1$ and $\theta_2$ which are introduced into the error resolver 9 where they are resolved into correction increments for the plane's position. While it is apparent that one station gimbal solver will satisfy the requirements of the invention in principle, more than one is shown in the preferred embodiment for reasons of greater accuracy and efficiency.

The three gimbal solvers and their driving connections being substantially identical in major respects the associated elements will be assigned the same characters differing only in subscripts. Subscripts $a$ and $b$ apply to the first and second station gimbal solvers respectively, subscript $c$ referring to the third or destination gimbal solver. Unless otherwise stated reference to the character having a subscript in connection with one gimbal assembly is also an applicable reference to the other assemblies.

Figure 3:
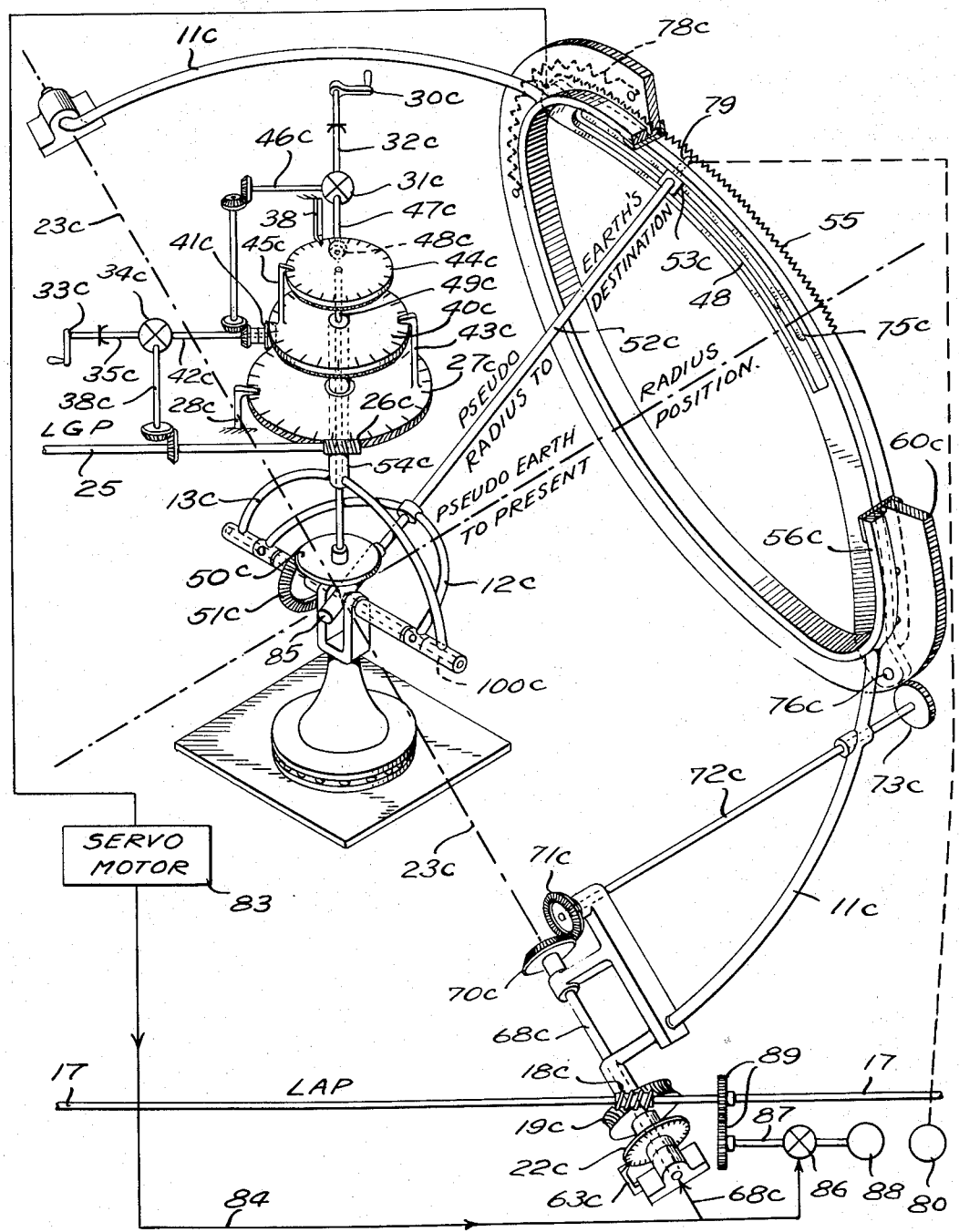
Fig. 3 is a schematic diagram of the destination gimbal computer.

The gimbal solvers each have three gimbals which are in the form of half rings. Outer gimbals 11a, 11b and 11c (Figs. 2 and 3) are pivoted on horizontal axes as are inner gimbals 12a, 12b and 12c. Intermediate gimbals 13a, 13b and 13c are pivoted on vertical axes which bisect the horizontal axes of the outer and inner gimbals and, as will become apparent, are coincident with the pseudo polar axes of each solver. For designative purposes the axes are called "vertical" and "horizontal." Actually, however, gimbal positions vary with the position of the aircraft so that a specific gimbal axis is vertical or horizontal only when the aircraft is level. Deviation of any gimbal axis from the stated horizontal or vertical is of no consequence since it is the relative gimbal positions that are involved in the computations.

Referring to Fig. 1 an assumed value for the plane's present latitude is manually placed on one side of differential 15 by handwheel 16. Assuming a gear type of differential this quantity is represented in the rotation of the spider and connected shaft 17 (see Fig. 2) on which there is mounted a worm 18a which engages gear 19a mounted on gimbal 11a. LAP dial 22a is supported by this gimbal and is calibrated for latitude indication and has a fixed indicator 63a. The outer gimbal 11a is pivoted through the hub of the dial 22a and its position relative to the horizontal or equatorial plane can be said to be representative of the present latitude of the plane.

An assumed value for the longitude of the plane is introduced into differential 20 by handwheel 21. The driven spider of the differential is in driving connection with shaft 25 on which worm 26a is mounted. The worm 26a is in engagement with plane longitude dial 27a thus giving a reading indication of the plane's present assumed longitude against a fixed index 28a. The axis of dial 27a is coincident with the vertical pseudo polar axes. After the assumed longitudes and latitudes have been corrected by means hereinafter explained, the dials 22a and 27a will indicate the true latitude and longitude of the plane.

Into gimbal computers 6, 7 and 8 are introduced the known coordinates of position for known point 1, known point 2 and the destination, respectively. Handwheels 30a, 30b and 30c, for introducing the latitudes $LA_1$, $LA_2$ and LAD, respectively, are connected to one side of differentials 31a, 31b and 31c, respectively. Similarly the known longitudes of the three points are introduced by handwheels 33a, 33b and 33c into one side of differentials 34a, 34b and 34c, through shafts 35a, 35b and 35c, respectively, for the three gimbal assemblies.

Shaft 25 is in geared connection with shafts 38a, 38b and 38c, which are connected to the other side of differentials 34a, 34b and 34c, respectively. The outputs of these differentials are the differences between the longitudes of the present position and the stations, as in gimbal computers 6 and 7 or the destination as in gimbal computer 8. The quantities are represented in the rotation of dials 40a, 40b and 40c, which are immediately above and concentric with dials 27a, 27b and 27c, respectively. The dials 40a, 40b and 40c are turned by bevel gears 41a, 41b and 41c, which are mounted on shafts 42a, 42b and 42c, respectively. These dials are read against moving indicators 43a, 43b and 43c, respectively, which are mounted on their respective present longitudinal dials below. The longitudes of the stations and the destination can thus be read directly. Dials 44a, 44b and 44c, for indicating the latitudes of the stations and destination are mounted on the pseudo polar axes immediately above the longitude dials and concentric therewith. These dials are read against indicators 45a, 45b and 45c, respectively, mounted on their respective dials 40a, 40b and 40c beneath. The quantities placed on the latter dials are thereby introduced into the upper dials and therefore must be removed if the upper dials are to give a true indication of the latitudes. Therefore these quantities are taken off shafts 42a, 42b and 42c, respectively by shafts 46a, 46b and 46c and placed into differentials 31a, 31b and 31c where they are subtracted from the latitudes which are manually introduced therein. The outputs of the differentials are used to rotate dials 44a, 44b and 44c by means of shafts 47a, 47b and 47c, respectively, and mounted gearing 48a, 48b and 48c in engagement therewith.

Dials 44a, 44b and 44c are connected at their centers to vertical shafts 49a, 49b and 49c coincident with the pseudo polar axes. Driven by these vertical shafts are bevel gears 50a, 50b and 50c, respectively, mounted thereon and in engagement with bevel gears 51a, 51b and 51c, respectively. The latter gears are mounted on horizontal shafts 100a, 100b and 100c being pinned thereto so as to drive the shafts in axial rotation. Inner gimbals 12a, 12b and 12c are similarly pinned to the horizontal shafts and are pivoted thereon as the shafts are rotated by the output of the differentials 31a, 31b and 31c, respectively. The intermediate or vertical gimbals 13a, 13b and 13c are freely supported by the horizontal shafts independent of their axial rotation and are held in vertical position by shafts 49a, 49b and 49c, respectively. Radius arms 52a, 52b and 52c are also freely supported by the horizontal shafts and are pivoted therewith by the inner gimbals 12a, 12b and 12c, respectively. These arms are partially supported by the inner gimbals and represent radii of the earth. Since a horizontal plane through the axes of the inner and outer gimbals is deemed to be the earth's equational plane, the ends of these shafts can be considered to represent the latitudes of the known point or the destination depending on the particular gimbal computer. It is noted that any change in the value for longitude of present position on the shaft 25 will introduce an error in the pivotal position of the radius arms 52a, 52b and 52c. This is due to the planetary motion of bevel gears 51a, 51b and 51c about their meshing bevel gears 50a, 50b and 50c, respectively, as the intermediate gimbals are pivoted as a result of this change. The output of differentials 31a, 31b and 31c, which is placed in the bevel gears therefore includes a correction value for longitude of present position so that the pivotal position of the radius arm will truly represent latitude.

Figure 5:
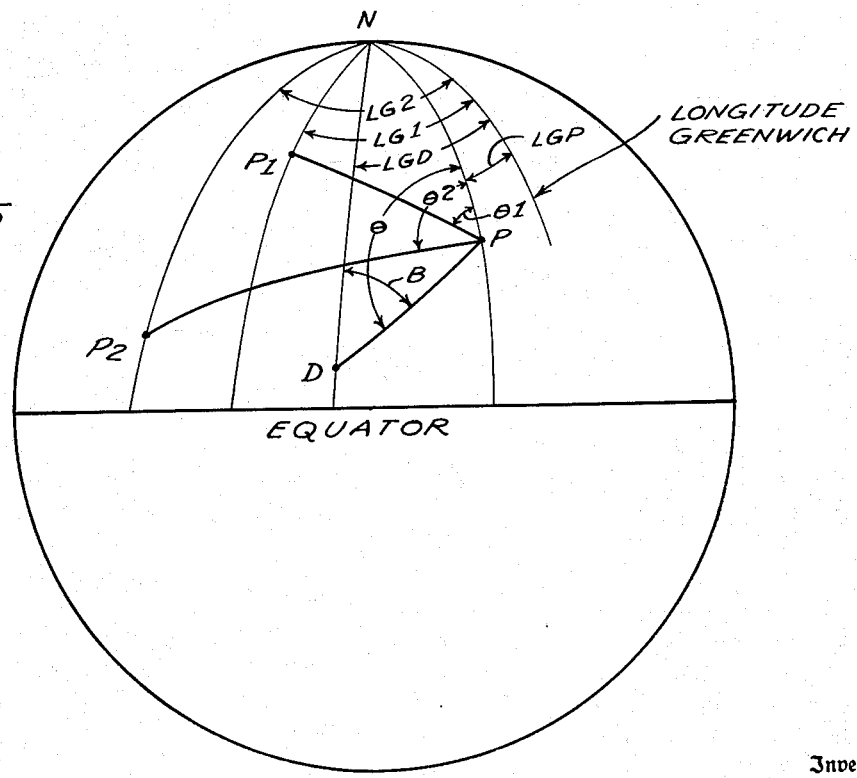
Fig. 5 is a diagram illustrating the various geometrical quantities solved by the invention.

The intermediate gimbals are pivotal about the vertical polar axes by means of their attachment to sleeves 54a, 54b and 54c at the bases of the sleeves. The top portions of the sleeves are axially connected to dials 40a, 40b and 40c, respectively. Their rotation represents the longitudinal differences between the present position and the known points. The outer gimbals 11a, 11b and 11c support rings 56a, 56b and 56c, respectively. The center of each ring is by definition the present position and is located at the terminus of the pseudo earth's radius which perpendicularly bisect the axes of the outer gimbal. Annular flanges 60a, 60b and 60c are concentrically and rotatably mounted on their respective rings and have a radius of curvature equal to the radius of the outer gimbals. The orientation of the flanges with relation to the rings represent the angles $\theta_1$, $\theta_2$ and $\theta$, which are the spherical angles defined by the paths between the plane's position and the known points and the local meridian as illustrated in Fig. 5. This is further considered below.

As explained above the angles $\theta_1$ and $\theta_2$ are known and are set into gimbal solvers 6 and 7 (Fig. 1), respectively. The quantities are represented in the orientation of flanges 60a and 60b and are introduced by handwheels 61a and 61b indicated in Fig. 1. They are respectively mounted on shafts 62a and 62b which are connected to one side of differentials 65a and 65b respectively. Differentials 65a and 65b have output shafts 68a and 68b. These shafts extend through the hubs of dials 22a and 22b and carry bevel gears 70a and 70b respectively on the end portions within the gimbal assemblies. Bevel gears 70a and 70b engage bevel gears 71a and 71b respectively which are mounted on one end of rotatable shafts 72a and 72b. These shafts carry at their other end portions gears 73a and 73b, respectively, which are in turning engagement with peripheral gears mounted on flanges 60a and 60b. As shown in Fig. 1 quantity KLAP is also set into shafts 68a and 68b through shaft 17 and differentials 65a and 65b to compensate for the error introduced by going through the LAP axis of the gimbal solvers. The means for introducing the error factor will be explained below.

The details of the error resolver 9 will now be described. Except when expressly noted the characters with subscripts refer to comparable elements in all their gimbal assemblies. A curved slotted arm 75a is pivotally mounted on the flanges of all the gimbal assemblies at 76a and has a radius of curvature equal to that of the outer gimbal. A block 53a connected to the end of radius arm 52a is carried in the slot of the arm 75a and is positioned in accordance with the latitude of the fixed point with respect to the equatorial plane and the longitude of the fixed point with respect to the present position as represented by the axial center of the ring 56a. It is, therefore, apparent that when the arm 75a passes directly over the axial center of the ring 56a it can legitimately be assumed to represent the path between the present position and the known point or station. In gimbal solver 8 this point is the destination and the angular position of arm 75c with respect to a pseudo meridian through the present position represents the desired great circle course of the plane.

The arm 75a carries a contactor at its free end which contacts arcuate potentiometer 78a the radial center of which coincides with pivotal axis of arm 75a. When the arm is off center, which can result either from an incorrect orientation of the flange 60a or from an erroneous assumption for the coordinates of present position, an error signal is sent out to be resolved into correction increments for the assumed position in the case of gimbal solvers 6 and 7 or an error in angle $\theta$ in the destination gimbal solver 8.

Figure 4:
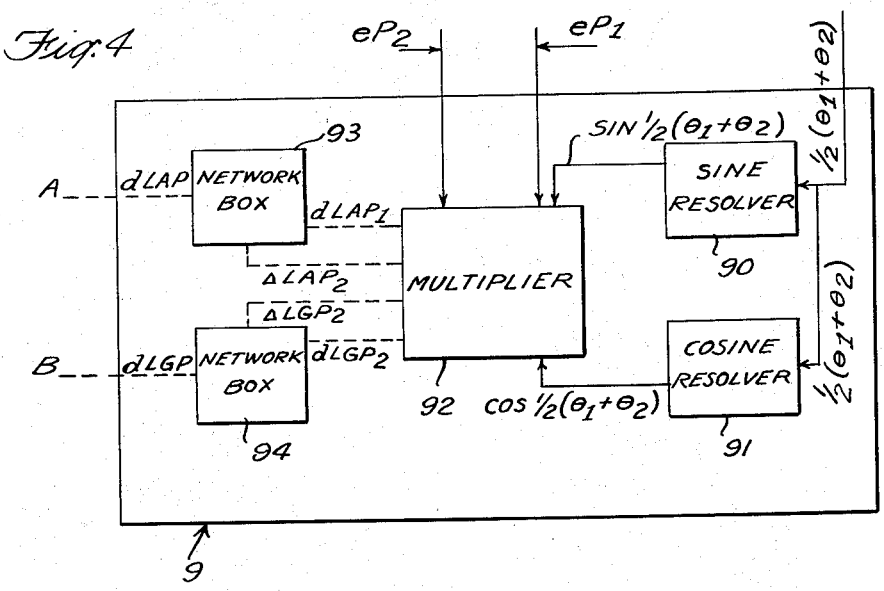
Fig. 4 is a schematic showing of the error reducer.

The error resolver 9 converts the error signals sent out from gimbal solvers 6 and 7 into correction factors for the coordinates of present position. The quantity $eP_1$ is the error in $\theta_1$ and $eP_2$ is the error in $\theta_2$. It is apparent that if the two error factors are small and in the same direction, then the present position P must be moved perpendicularly to a bisector of the angle formed by $\theta_1$ and $\theta_2$ and if the error factors are in different directions the point P is moved generally along the bisector to eliminate the errors in $\theta_1$ and $\theta_2$. It is assumed that the new locus for the present position is located approximately the same number of degrees from the assumed position P as the error in the bearing on the fixed point from the assumed position. Resolving with respect to the bisector of $\theta_1$ and $\theta_2$ therefore converts this angular change along or perpendicular to the bisector to correction factors for the coordinates of present position. This resolution is achieved in accordance with the following equations for the error $eP_1$:

(1) $\qquad dLAP_1 = -eP_1 \sin \frac{1}{2}(\theta_1 + \theta_2)$ (2) $\qquad dLGP_1 = -eP_1 \cos \frac{1}{2}(\theta_1 + \theta_2)$ Similar computations are made to determine the latitudinal error ($dLAP_2$) and the longitudinal error ($dLGP_2$) due to the error $eP_2$. The total latitudinal error ($dLAP$) and the total longitudinal error ($dLGP$) are averaged from the individual errors, thus:

(3) $\qquad dLAP = \frac{1}{2}(dLAP_1 + dLAP_2)$ (4) $\qquad dLGP = \frac{1}{2}(dLGP_1 + dLGP_2)$ The angles $\theta_1$ and $\theta_2$ are taken off shafts 62a and 62b, respectively, and placed into differential 66 as by shafts 67a and 67b, respectively. The output $\frac{1}{2}(\theta_1 + \theta_2)$ of the differential is introduced into angle resolvers 90 and 91 where the required trigonometric computations are made the functions being set into a multiplier 92 where they are combined with error signals $eP_1$ and $eP_2$ to solve Equations 1 and 2 for both errors. Conventional angle resolvers such as of the synchro type may be employed for the purpose of computing the required trigonometric functions in the error resolver. The errors $eP_1$ and $eP_2$ are taken off the potentiometers 78a and 78b and set into multiplier 92 by electrical connections as shown by the dotted lines in Fig. 1 and Fig. 4. Adding networks of resistances in network boxes 93 and 94 are used in connection with the multiplier for finding the mean error corrections in accordance with Equations 3 and 4.

The total errors are supplied to servo amplifiers 77a and 77b for the latitudinal and longitudinal coordinates respectively and thence to servomotors 74a and 74b, respectively, from which they are set into differentials 15 and 20, respectively, to be combined with the original or assumed values for latitude and longitude of present position as correction factors therefor. The position of arms 75a and 75b is pivotally adjusted in accordance with the new values for present position. Assuming the correct values for $\theta_1$ and $\theta_2$ have been set into the gimbal solvers 6 and 7 to orient the flanges 60a and 60b, respectively, the altered positions of the arms should bring them over the center of the discs resulting in a discontinuance of the error signals.

The correct values for the coordinates of the plane's positions are indicated on the latitude and longitude dials and are available for introduction into the destination gimbal solver 8 by means of shafts 25 and 17. A correct representation of the latitude of the plane is represented by the angle which the gimbal 11c makes with the horizontal plane. This gimbal is positioned by LAP servomotor 74a, shaft 17 and worm gearing. A new value for the plane's longitude results in the rotation of shaft 42c and the pivotal displacement of the horizontal axis of the intermediate gimbal 12c and radius arm 52c perpendicular thereto. The latitude of the aircraft is thereby accurately represented on the outer gimbal. The block 53c is moved in the slot of arm 75c on which there is mounted a curved distance potentiometer 55 the center of curvature being the pivotal point of the radius arm. Attached to the block 53c is a sliding contact 79 for the distance potentiometer. Displacement of the sliding contact from its central position represents the distance between the aircraft's position and the destination. Hence a voltage which is a function of the distance can be derived from the potentiometer, and the distance is indicated by a hand on dial 80.

The correct orientation of the flange 60c to derive $\theta$ is accomplished in the following manner:

When the arm 75c is off center an error signal $e\theta$ is sent from potentiometer 78c which is mechanized by a servomotor 83 which drives shafts 84 and 68c. Shaft 68c is coincident with the horizontal axis of the latitude gimbal 11c and is in driving connection with flange 60c by virtue of bevelled gears 70c and 71c, shaft 72c and gear 73c in engagement with the flange. Shaft 84 is also connected to one side of differential 86 the other side of which is connected by shaft 87 to LAP shaft 17 by means of engaging gears 89. The quantity K(LAP) is thereby removed from the other input to differential 86 to compensate for the introduction of the quantity K(LAP) due to the planetary action of bevel gear 70c on shaft 72c during the positioning of the outer gimbal 11c. K is a constant equal to the planetary train value.

The error signal $e\theta$ orients the flange 60c on the LAP gimbal 11c until the arm 75c crosses the center of the support ring 56c which is the derived present position of the plane. The angle which the arm makes with an axis parallel to the pseudo polar axis through the point P representing the present position then becomes the angle $\theta$.

When the arm is centered, the error signal is nulled as a result of the sliding contact being on the point of zero potential on potentiometer 78c. Since the servomotor 83 causes the flange 60c to follow the angular motion of the slotted arm 75c, its output is a function of θ. The output of differential 86, therefore, represents the course to destination and is indicated on dial 88. Since θ is the interior angle of a spherical triangle, illustrated in Fig. 5 it must be converted into an azimuth heading. The procedure for making the conversion is a simple one and not shown. It can be done simply by reversing its polarity by adding π radians. The computed azimuth is then compared electrically, as in a synchro generator, with the compass heading to determine the heading error.

The third output of the destination gimbal solver 11c is the interior angle B of the spherical triangle shown in Fig. 5. This angle is represented by the rotation of shaft 52c supported by gimbal solver 12c. One end of the shaft is secured to the block 53c and the other end is attached to the rotor of the synchro generator 85 whose housing is secured to the horizontal shaft 100c. The generator transmits a function of the interior angle B electrically. The angle B is converted to a computed azimuth at the destination by addition of the constant offset π means for which are not shown. The computed azimuth is for a great circle course from the present position to the destination.

The foregoing represents a preferred computer system illustrating several separately and collectively useful features of my invention, as pointed out in the following claims.

What is claimed is:

1. A navigational computer for determining the coordinates of present position comprising a gimbal assembly which includes means for representing an assumed latitude of present position, means for representing the difference between the longitude of a known point on the earth's surface and an assumed longitude of present position, means representing a course to the known point from an assumed position, means for introducing into said gimbal assembly a course to the known point from the actual present position, a potentiometer adapted to produce a voltage output which is a function of the error or angular discrepancy between the said courses, an error reducer in connection with the potentiometer for converting the error signal into correction factors for the assumed coordinates of present position, means for introducing the angle bisector of the said courses into the error reducer, and means for combining the correction factors with the assumed coordinates of position.

2. A navigational computer for determining the coordinates of present position comprising a gimbal assembly which consists of an outer gimbal pivotal on a horizontal axis, means for pivoting the said outer gimbal, a rotatable flange mounted on the outer gimbal, means for rotating the said flange, a potentiometer mounted on said flange, a pivot arm mounted on said flange the free end of which has a contactor for the said potentiometer, an inner gimbal pivotal within the outer gimbal on a horizontal shaft as an axis, a vertical gimbal intermediate the inner and outer gimbals carried by said horizontal shaft and supported in a vertical position by a vertical shaft operatively connected to said horizontal shaft to turn said horizontal shaft and pivot the inner gimbal, means connected to said vertical shaft to pivot said inner gimbal, means to rotate said horizontal shaft in the horizontal plane about an axis coincident with the said vertical shaft, a radius arm normal to said horizontal shaft and supported thereby at one end, the other end being slidably supported by inner gimbal and connected to said pivot arm means for pivoting said outer gimbal in accordance with an assumed latitude of present position, means for rotating said horizontal shaft about an axis coincident with the vertical shaft in accordance with the difference between a longitude of a fixed point and an assumed longitude for present position, means for rotating said flange in proportion to a spherical angle defined by the local meridian and the course from present position to a known point, an error reducer electrically connected to said potentiometer for supplying correction factors for the assumed coordinates of present position, means for introducing into the error reducer the angle bisector of a spherical angle defined by the courses to two known points from the present position and means separately connecting said outer gimbal and horizontal shaft to said error reducer for introducing the said corrections factors into the gimbal assembly to change the relative gimbal positions until the energization from the potentiometer is stopped.

3. A navigational computer for determining the coordinates of present position comprising a gimbal assembly which consists of an outer gimbal pivotal on a horizontal axis, means for pivoting the said outer gimbal in proportion to the assumed latitude of present position, a rotatable flange mounted on the outer gimbal having a radius of curvature equal to the radius of the outer ring, means for rotating the flange in proportion to the spherical angle defined by the local meridian and the course from present position to a known point, a pivot arm mounted on said flange the free end of which has a potentiometer contactor, a potentiometer mounted on said flange and formed in an arc whose center is the pivotal axis of said arm the output of which is zero when the arm is centered, an inner gimbal pivotal within the outer gimbal on a horizontal shaft as an axis, a vertical gimbal intermediate the inner and outer gimbals carried by said horizontal shaft and supported in a vertical position by a vertical shaft which is operatively connected to said horizontal shaft to turn said horizontal shaft and pivot the inner gimbal mounted thereon, means connected to said vertical shaft for pivoting said inner gimbal in proportion to the latitude of the known point, means for rotating said horizontal shaft in the horizontal plane axially about an axis coincident with said vertical shaft in proportion to the difference between the longitudes of present position and the known point, a radius arm normal to said horizontal shaft and supported thereby at one end, the other end being slidably supported by said inner gimbal and connected to said pivot arm, an error reducer electrically connected to said potentiometer for supplying correction factors for the assumed coordinates of present position, means for introducing into the error reducer the angle bisector of a spherical angle defined by the courses to two known points from the present position and means connected to said outer gimbal and horizontal shaft for introducing the said correction factors into the gimbal assembly to change the relative gimbal positions until the energization from the potentiometer is stopped.

4. A computer as defined in claim 3 wherein the means for pivoting the outer gimbal comprises a dial calibrated to indicate present latitude and connected axially to the outer gimbal.

5. A computer as defined in claim 4 wherein the means for rotating the horizontal shaft in the horizontal plane comprises a dial connected to the said horizontal shaft which is turned by an amount proportionate to the difference between the longitude of a known point and the assumed longitude of the present position.

6. A computer as defined in claim 5 in which there is provided means for rotating the vertical shaft comprising a second dial mounted on the vertical shaft concentric with the first mentioned dial and which is turned by an amount proportionate to the latitude of a known point.

7. An error reducer for supplying correction factors for assumed coordinates of position comprising a resolver for computing the sine of one-half the sum of two spherical angles, one angle being that which is formed by the local meridian and course to a known point and the second angle being that which is formed by the local meridian and the course to a second known point, a second resolver for computing the cosine of one-half the same two angles, means for multiplying the trigonometric functions by a voltage which is proportionate to the angular discrepancy between the angle defined by the course from the actual present position to the known point and the local meridian and the angle defined by the course to the known point from an assumed present position and the local meridian, means for determining the angular discrepancy and introducing it into the said multiplying means, input means for introducing the said spherical angles to the error reducer.

8. A navigational computer for computing the great circle distance from present position to a known destination which comprises a gimbal assembly which consists of an outer gimbal pivotal on a horizontal axis, means for pivoting the said outer gimbal in proportion to the known latitude of present position, a pivot arm one end of which is mounted on said outer gimbal and having a radius of curvature equal to that of the outer gimbal, a curved potentiometer mounted on the said pivot arm, an inner gimbal pivotal within the outer gimbal on a horizontal shaft as an axis, a vertical gimbal intermediate the inner and outer gimbals carried by said horizontal shaft and supported in a vertical position by a vertical shaft which is operatively connected to said horizontal shaft to turn said horizontal shaft and pivot the inner gimbal mounted thereon, means to rotate said horizontal shaft in the horizontal plane about an axis coincident with said vertical shaft in proportion to the difference between the longitudes of the present position and the destination, means connected to said vertical shaft to pivot said inner gimbal in proportion to the latitude of the destination, a radius arm normal to said horizontal shaft and supported thereby at one end, the other end being slidably supported by said inner gimbal and connected to said pivot arm and having a contactor mounted thereon in contact with the said potentiometer, means for pivoting the end of the said pivot arm which is mounted on the said outer gimbal, and means electrically connected to the said contactor for indicating the desired distance.

9. A computer as defined in claim 8 whereby the means for pivoting the said pivot arm comprises a rotatable flange mounted on the said outer gimbal.

10. A navigational computer for computing a spherical angle based on which the proper heading for following a great circle course from present or transit position on the earth's surface to a known destination can be determined comprising a gimbal assembly which consists of an outer gimbal pivotal on a horizontal axis, means for pivoting the said outer gimbal in proportion to the latitude of present position, a rotatable flange mounted on the outer gimbal having a radius of curvature equal to the radius of the outer ring, a pivot arm mounted on said flange the free end of which has a potentiometer contactor, a potentiometer in contact with said contactor mounted on said flange and formed in an arc whose center is the pivotal axis of said arm, an inner gimbal pivotal within the outer gimbal on a horizontal shaft as an axis, a vertical gimbal intermediate the inner and outer gimbals carried by said horizontal shaft and supported in a vertical position by a vertical shaft which is operatively connected to said horizontal shaft to turn said horizontal shaft and pivot the inner gimbal mounted thereon, means connected to said vertical shaft for pivoting said inner gimbal in proportion to the latitude of the destination, means for rotating said horizontal shaft in the horizontal plane about an axis coincident with said vertical shaft in proportion to the difference between the longitudes of the present position and the destination, a radius arm normal to said horizontal shaft and supported thereby at one end, the other end being slidably supported by said inner gimbal and connected to said pivot arm, means connected to said potentiometer contactor for rotating the flange until said pivot arm intersects the axial center of said rotatable flange, and means responsive to said last mentioned means to indicate the desired course angle.

11. A navigational computer for computing the spherical angle defined by the great circle course from present position to destination and a meridian line through the destination comprising a gimbal assembly which consists of an outer gimbal pivotal on a horizontal axis, means for pivoting the said outer gimbal in proportion to the latitude of present position, a rotatable flange mounted on the outer gimbal having a radius of curvature equal to the radius of the outer ring, a pivot arm mounted on said flange, an inner gimbal pivotal within the outer gimbal on a horizontal shaft as an axis, a vertical gimbal intermediate the inner and outer gimbals carried by said horizontal shaft and supported in a vertical position by a vertical shaft which is operatively connected to said horizontal shaft to turn said horizontal shaft and pivot the inner gimbal mounted thereon, means connected to said vertical shaft for pivoting said inner gimbal in proportion to the patitude of the destination, means for rotating said horizontal shaft in the horizontal plane about an axis coincident with said vertical shaft in proportion to the difference between the longtitudes of the present position and the destination, and a radius arm normal to said horizontal shaft and supported by the horizontal shaft at one end of said arm, the other end being slidably supported by said inner gimbal and connected to said pivot arm.

12. A navigational computer comprising in combination means for converting an error in the spherical angle formed by a great circle course from present position to a known point on the earth's surface and the local meridian into correction factors for the coordinates of present position, means for combining the correction factors with assumed coordinates of present position to produce the correct coordinates of present position, a second computer for computing the great circle distance from present position to a known destination having a curved potentiometer, a contactor for the said potentiometer, and gimbal means for moving the contactor on the potentiometer a distance proportionate to the difference between the latitude of present position and destination and proportionate to the difference between the longitudes of the present position and destination so that the potentiometer will yield a voltage which is a function of the desired distance, and means connecting said contactor to said second mentioned means for introducing the corrected coordinates of present position into the said second computer.

13. A navigational computer comprising in combination means for converting an error in the spherical angle formed by a great circle course from present position to a known point in the earth's surface and the local meridian into correction factors for the coordinates of present position, means for combining the correction factors with assumed coordinates of present position to produce the correct coordinates of present position, a second computer for computing a spherical angle based on which the proper heading for following a great circle course from present or transit position to a known destination including a rotatable flange, a pivot arm one end of which is mounted on the said flange, a potentiometer on said flange, a contactor attached to the free end of said pivot arm and formed in an arc the center of which coincides with the pivotal axis of the pivot arm, gimbal means for changing the angular position of the pivot arm in accordance with the difference between the latitudes of present position and destination and the difference between the longitudes of present position and destination and a servomechanism in driven connection with the potentiometer and in driving connection with the flange to cause the flange to follow the angular motion of the pivot arm with respect to a reference line representing a local meridian, and means for introducing the corrected coordinates of present position into said second computer.

14. A navigational computer comprising in combination means for converting an error in the spherical angle formed by a great circle course from present position to a known point in the earth's surface and the local meridian into correction factors for the coordinates of present position, means for combining the correction factors with assumed coordinates of present position to produce the correct coordinates of present position, a second computer for computing the spherical angle defined by the great circle course from present position to destination and a meridian line through the destination including a horizontal shaft, a radius arm one end of which is supported by said shaft, gimbal means to pivot the other end of said radius arm about a horizontal axis proportionately to the latitude of the destination and gimbal means to rotate the said horizontal shaft with respect to a fixed reference line respresening the local meridian proportionately to the difference between the longitudes of the destination and the present position, an outer gimbal pivotally connected to the other end of said radius arm, said gimbal being itself pivotal about a horizontal axis, and means connecting said second mentioned means with said radius arm and said outer gimbal for introducing the corrected coordinates of present position into the said second computer.

References Cited in the file of this patent

UNITED STATES PATENTS

| | | |
|---|---|---|
| 2,077,398 | Clark | Apr. 20, 1937 |
| 2,378,981 | Chamberlain | June 26, 1945 |
| 2,569,328 | Omberg | Sept. 25, 1951 |

FOREIGN PATENTS

| | | |
|---|---|---|
| 150,125 | Great Britain | Sept. 2, 1920 |